United States Patent
Kravitz

(10) Patent No.: US 9,866,103 B2
(45) Date of Patent: Jan. 9, 2018

(54) MAGNETIC CAPACITIVE CURRENT LIMIT CIRCUIT FOR TRANSFORMERS

(71) Applicant: Switching Power, Inc., Ronkonkoma, NY (US)

(72) Inventor: Melvin Kravitz, Port Jefferson, NY (US)

(73) Assignee: SWITCHING POWER, INC., Ronkonkoma, NY (US)

( * ) Notice: Subject to any disclaimer, the term of this patent is extended or adjusted under 35 U.S.C. 154(b) by 0 days.

(21) Appl. No.: 15/268,118

(22) Filed: Sep. 16, 2016

(65) Prior Publication Data

US 2017/0085169 A1    Mar. 23, 2017

Related U.S. Application Data

(60) Provisional application No. 62/220,612, filed on Sep. 18, 2015.

(51) Int. Cl.
| | |
|---|---|
| *H02M 7/08* | (2006.01) |
| *H02M 1/12* | (2006.01) |
| *H02M 1/44* | (2007.01) |

(52) U.S. Cl.
CPC ............ *H02M 1/126* (2013.01); *H02M 1/44* (2013.01); *H02M 7/08* (2013.01)

(58) Field of Classification Search
CPC .......... H02M 1/126; H02M 1/14; H02M 1/31; H02M 7/0627; H02M 1/32; H02M 7/062; H02M 7/08
USPC ....... 363/44, 45, 47, 48, 53, 67, 69, 70, 126
See application file for complete search history.

(56) References Cited

U.S. PATENT DOCUMENTS

| | | | |
|---|---|---|---|
| 8,665,618 B2 | 3/2014 | Kravitz | |
| 8,687,388 B2* | 4/2014 | Jang | H02M 1/4216 363/44 |
| 8,891,261 B2* | 11/2014 | Jang | H02M 1/4216 363/44 |
| 2009/0154203 A1* | 6/2009 | Kravitz | H02M 1/15 363/45 |
| 2012/0008355 A1* | 1/2012 | Kravitz | G05F 1/70 363/126 |

(Continued)

*Primary Examiner* — Jeffrey Sterrett
(74) *Attorney, Agent, or Firm* — Scully, Scott, Murphy & Presser, P.C.

(57) ABSTRACT

Circuit and apparatus for improving operating features characteristics of DC power supplies implementing three Phase transformer devices of the type such as 12-step and 24-step transformers. The circuit and apparatus reduces harmonic AC input current while providing almost unity power factor for DC power supply outputs intended for aircraft or marine applications where size and weight are concerns. The circuit includes a passive series connected nonlinear resonant LC circuit connected at each phase of the input to the three phase transformer With the three phase transformer having the added series nonlinear resonant LC circuit, the power supply is enhanced with current limiting for the entire transformer, rectifier and load, due to load shorting, input voltage transients, transformer winding short circuit or rectifier failure. Further, such apparatus provides limiting of power inrush currents during voltage application or turn on, while also providing EMI filtering.

10 Claims, 4 Drawing Sheets

12 STEP (PULSE) HARMONIC CURRENT CORRECTED POWER SUPPLY

(56) References Cited

U.S. PATENT DOCUMENTS

2015/0124505 A1* 5/2015 Wang .................... H02M 7/219
                                                363/126
2017/0085169 A1* 3/2017 Kravitz ................ H02M 1/126

* cited by examiner

12 STEP (PULSE) HARMONIC CURRENT CORRECTED POWER SUPPLY

MAGNETIC CAPACITIVE CURRENT LIMIT CIRCUIT FOR TRANSFORMERS

CROSS-REFERENCE TO RELATED APPLICATIONS

This disclosure relates to and claims the benefit of the filing date of commonly-owned, U.S. Provisional Patent Application No. 62/220,612, filed Sep. 18, 2015, the entire contents and disclosure of which is incorporated by reference as if fully set forth herein.

FIELD OF THE INVENTION

The present invention relates to improvements for DC power supplies having a 12 step three-phase transformer configuration, and specifically an apparatus for such transformers to provide current limiting for the entire transformer, and when used as a power supply front end, protection for failure of rectifiers and load shorting. The improved circuit also provides power inrush current limiting during voltage application or supply turn, while providing EMI filtering, lower AC harmonic current and approximately unity power factor.

BACKGROUND

FIG. 1 illustrates a schematic diagram of a conventional three-phase, 12 step (pulse) transformer rectifier power supply 10. The conventional 12 step transformer rectifier power supply 10 shown is designed to provide lower harmonic AC input current and relatively high power factor for DC outputs. However, these existing designs are deficient in that, secondary voltages produced are not inherently current limit protected, and separate circuits need to be employed to protect against primary transformer failure or secondary circuit electrical failures or short circuits.

From FIG. 1, a three phase input voltage, e.g., at 50 Hz, 60 Hz or 400 Hz can typically be applied to a three phase transformer with Delta and Wye secondaries adjusted in turns for equal voltage output to two 3-phase rectifiers with each rectified secondary being placed in parallel through balancing inductors to a common load, the voltage so derived is usable by electronic loads. The Wye transformer secondary voltage phase shift with respect to the corresponding Delta secondary is 15 degrees, and hence the 'step' input current waveform with 360degrees/30=12 steps or input current pulses. Similarly a 24 step(pulse) transformer would contain primary Delta-Wye interconnected windings and corresponding secondary winding yielding an input current waveform with 360 degrees/15=24 steps or input current pulses. Since this waveform has twice as many steps, it more closely approximates a sinusoidal input current and will yield 5-6% harmonic current. However since abrupt changes in the current are still present the EMI spectrum is large, and no overload protection is provided for the high power, or low impedance transformer, that is failure of a rectifier or shorted circuit on the load will require fuses and or circuit interrupt switches. In addition turn inrush current is not limited when an input switch 101 is activated (turned-on), unless a specific inrush current limiter is added.

FIG. 2 depicts a plot of an input current waveform 20 at any of the three line phase lines of the conventional 12 step (pulse) transformer rectifier power supply (e.g., a 48 Volt, 2 KW load) in an uncorrected power supply system that produces input harmonic currents exceeding 10% which is undesirable for most current power systems. Most military-grade power systems require less than 5% limits on harmonic current.

In FIG. 1, the supply 10 includes a three phase transformer with separate Delta and Wye secondaries, two full wave rectifiers connected trough balancing inductors to a common load. The source may be a three phase commercial power line such as the 110-125 volt 50-60 HZ or 400 HZ available from a generator. The common parallel secondary D.C. Voltage is then filtered by output capacitor Co and used by the electronic loads. The Delta transformer Primary to Delta transformer secondary voltage phase remains a zero phase shift while the Wye secondary phase shift with respect to the Delta primary is 30 degrees, after rectification and paralleling with supply loading the input 'step' or pulse current waveform is generated.

This output voltage from power supply is a suitable low voltage supply for any of a number of electronic equipment applications, such as computer systems, medical instrumentation, telephone switching systems, machine control systems, or other apparatus employing semiconductor devices or integrated circuitry or that requires supply voltages.

By way of example, however, the typical efficiency of such prior art power supplies may exceed 85% for 425 volt outputs and 80% for 48 volt outputs, but with relatively low power factors for reasons discussed herein with reference to FIG. 2.

SUMMARY

There is provided an apparatus and circuit enhancement for an AC to DC power supply that provides high efficiency of power conversion, reduction of line harmonic current while achieving near unity power factor.

The apparatus and circuit enhancements may be provided for a 12-step (pulse) or 24-step (pulse) configured transformer design for a DC power supply.

The apparatus and circuit enhancements for the AC to DC power supply further limits in-rush currents, such as exhibited at device turn-on, provides short circuit protection to the power supply, and enhances filtering of electromagnetic interference (EMI).

In one embodiment, the apparatus and circuit enhancement comprises a series resonant LC circuit including a series connected passive nonlinear inductor (L) and capacitor element (C) at each transformer phase input to provide an adjustable impedance which is current dependent to enhance the performance of regulated DC power supplies. This enhancement reduces the need for complex 24 step (pulse) transformers by reducing the current levels to below 2% at harmonic frequencies while providing almost unity power factor using a simple 12 step transformer.

In addition, the apparatus and circuit enhancement including the series nonlinear resonant LC circuit for the DC power supply also provides enhanced electromagnetic interference (EMI) filtering due to harmonic current spectrum reduction.

Thus, in one aspect there is provided an AC to DC power supply. The AC to DC power supply comprises: an n-step or pulsed power transformer rectifier configured to receive a 3-phase current from a connected 3-phase unregulated AC power source, the n-step or pulsed power transformer rectifier power supply having respective inputs associated with a respective phase, and the power supply including at least a primary transformer winding, and a Delta connected secondary transformer and a Wye connected secondary transformer, each Delta and Wye connected secondary transformer operatively coupled to the n-step or pulsed power transformer rectifier and having windings in parallel to provide a DC voltage; a passive circuit at each respective input of a respective phase, the passive circuit comprising a nonlinear resonant series connected LC circuit wherein L is inductor having an inductance and C is a capacitor having a capacitance, the inductance in combination with the capacitance of values reducing odd harmonic frequency current components from the line current drawn by the power supply in response to a load being placed on the AC to DC power supply, the inductance in combination with the capacitance having values that set the LC circuit near resonance and below the fundamental frequency of the 3-phase current; and wherein the power supply odd harmonic current components from the line current are reduced to less than approximately 2% cent of an uncorrected value to thereby reduce electromagnetic interference while achieving a power factor value of greater than about 0.98 at less than about 1% loss in line operating input voltage.

In a further aspect, there is provided a method of operating an AC to DC power supply having an n-step or pulsed power transformer rectifier configured to receive a 3-phase current from a connected 3-phase unregulated AC power source, the n-step or pulsed power transformer rectifier power supply having respective inputs associated with a respective phase, and the power supply including at least a primary transformer winding, and a Delta connected secondary transformer and a Wye connected secondary transformer, each Delta and Wye connected secondary transformer operatively coupled to the n-step or pulsed power transformer rectifier and having windings in parallel to provide a DC voltage output. The method comprises: providing at each respective input of a respective phase a nonlinear resonant series LC circuit wherein L is inductor having an inductance and C is a capacitor having a capacitance, an inductance value and capacitance value of the nonlinear resonant series LC circuit configured to achieve near resonance and below a fundamental frequency of the 3-phase current; connecting a power supply load to an output of the AC to DC power supply; and reducing, based on the configured nonlinear resonant series LC circuit, the AC to DC power supply odd harmonic frequency current components from the line current drawn by the power supply having the connected power supply load, wherein the odd harmonic frequency current components from the line current are reduced to less than approximately 2% cent of an uncorrected value to thereby reduce electromagnetic interference while achieving a power factor value of greater than about 0.98 at less than about 1% loss in line operating input voltage.

In addition, during power supply turn on, the input current surge drawn by the transformer or load, results in an impedance increase in the non-linear LC circuit thus limiting the inrush current. Similarly, short circuit on the secondary due to rectifier or load failure results in input current limiting.

BRIEF DESCRIPTION OF THE SEVERAL VIEWS OF THE DRAWINGS

Other aspects, features and advantages of the present invention will become more fully apparent from the following detailed description, the appended claims, and the accompanying drawings in which similar elements are given similar reference numerals.

DETAILED DESCRIPTION

Figure 3:
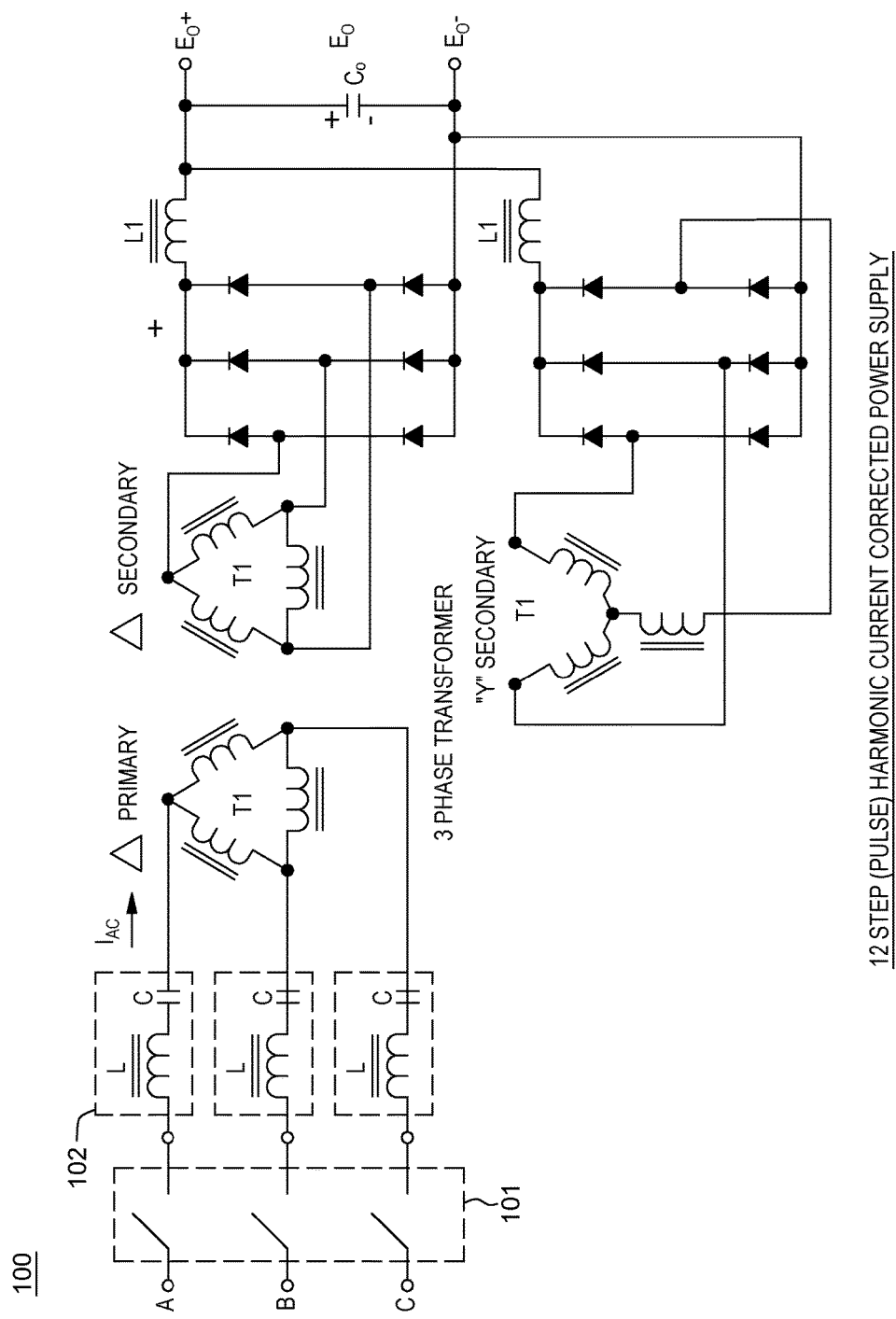
FIG. 3 illustrates the passive circuit elements L and C of the series nonlinear resonant LC circuit in each phase of the input to the three phase transformer in a power supply 100 to provide the current harmonic reduction.

Referring to FIG. 3, in one embodiment, there is provided a DC to AC power supply apparatus 100 having circuitry 102 for improving the harmonic current for a 12 step or pulse transformer, while improving the power factor, providing short circuit current limiting for rectifier failure as well as inrush current limiting when input switch 101 is activated (turned ON). In addition, any electromagnetic interference (EMI) generated is reduced, since the input current is near sinusoidal at the generator frequency. The use of this apparatus 100 with the least complex 12 step transformer also improves the reliability of the power supply, while generating the benefits described herein and reduces the need for complex 24 step (pulse) transformer.

Particularly according to an embodiment of the present invention, the circuit 102, e.g., a harmonic current correction circuit, includes a nonlinear inductor and capacitor, the former being electrically connected in series with the capacitor, and the same (repeating) circuit is placed in each phase between the source and the uncorrected power supply input. For a rated load the impedance introduced as function of frequency per phase is $|Z|$. For this circuit, a series R L C circuit per phase as shown in FIG. 3, the series connection of inductor and capacitor, exhibits a magnitude of impedance ($|Z|$) according to:

$$|Z|=R+\omega Lj+1/(\omega Cj)$$

where $\omega L$ is the inductive reactance component ($|X_l|$) and $1/\omega C$ is the capacitive reactance component ($|X_c|$) of the impedance and R the resistance.

Impedance $|Z|=\sqrt{(R^2+(X_l-X_c)^2)}$ is present to current flow from the source. If $X_l=X_c$ then the loss due to line current flow at the fundamental frequency is $I_{AC}^2*R$, and can be minimized by design. In one example embodiment, use of an inductor L and capacitor C near resonance but below the fundamental frequency achieves efficiency of greater than 99.5%, the $|Z|$ being low at the generator fundamental frequency less than an ohm. While increasing $|Z|$ with frequency reduces harmonic current amplitudes that would flow due to the transformer Delta-Wye secondary rectifier loading. The uncorrected line current, for each phase, can be represented by its Fourier Series as follows:

$$i_\theta(t) = \sum_{n=1,3,5,7,9}^{\infty} i(t)\sin(w_o nt + \theta)$$

where θ is a transformer phase, $i(t)=\int i_1(t)\sin(w_o nt)$ are the Fourier coefficients; and $I_{RMS}$ is the line current: $I_{RMS}=\sqrt{(I_1^2+I_3^2+I_5^2+I_7^2+...+I_n^2)}$ where $I_1$=RMS value of the fundamental current; and the line current=$I_{RMS}$=$I_1$ when all harmonics are 0.

From the above equations, it is can be seen that the harmonic current is reduced as impedance to these higher frequency components is increased. It should also be noted that the flux in the core of L is a function of $I_{AC}$, that provides a mechanism to support the current limiting.

Thus, referring to FIG. 3, the circuit 102 including Inductance L and C are designed and selected at a value calculated to attenuate the odd harmonics that otherwise distort the current $I_{AC}$ from the AC power line. The harmonics are attributable principally the 'step' waveform approximation to a sin wave input current. Particularly, by proper selection of the value of inductance L and C, the odd harmonic currents may be reduced to less than approximately 2% of their uncorrected value.

From the above the inductor and capacitor have a magnitude of impedance |Z| related to the square root of $(R^2+(X_l-X_c)^2)$, if $X_l=X_c$ then the loss due to line current flow at the fundamental frequency is $I_{AC}2*R$, and can be minimized by design, e.g., by use of an inductor and capacitor having combined impedance near resonance but below this frequency. Efficiency of greater than 99.5% is demonstrated, i.e., the |Z| is low at the generator fundamental frequency. While increasing |Z| with frequency reduces harmonic current amplitudes that would flow due to the power supply input rectifier and bulk storage capacitor. The uncorrected line current can be represented by its Fourier Series. The harmonic current is reduced as impedance to these higher frequency components is increased.

Figure 4:
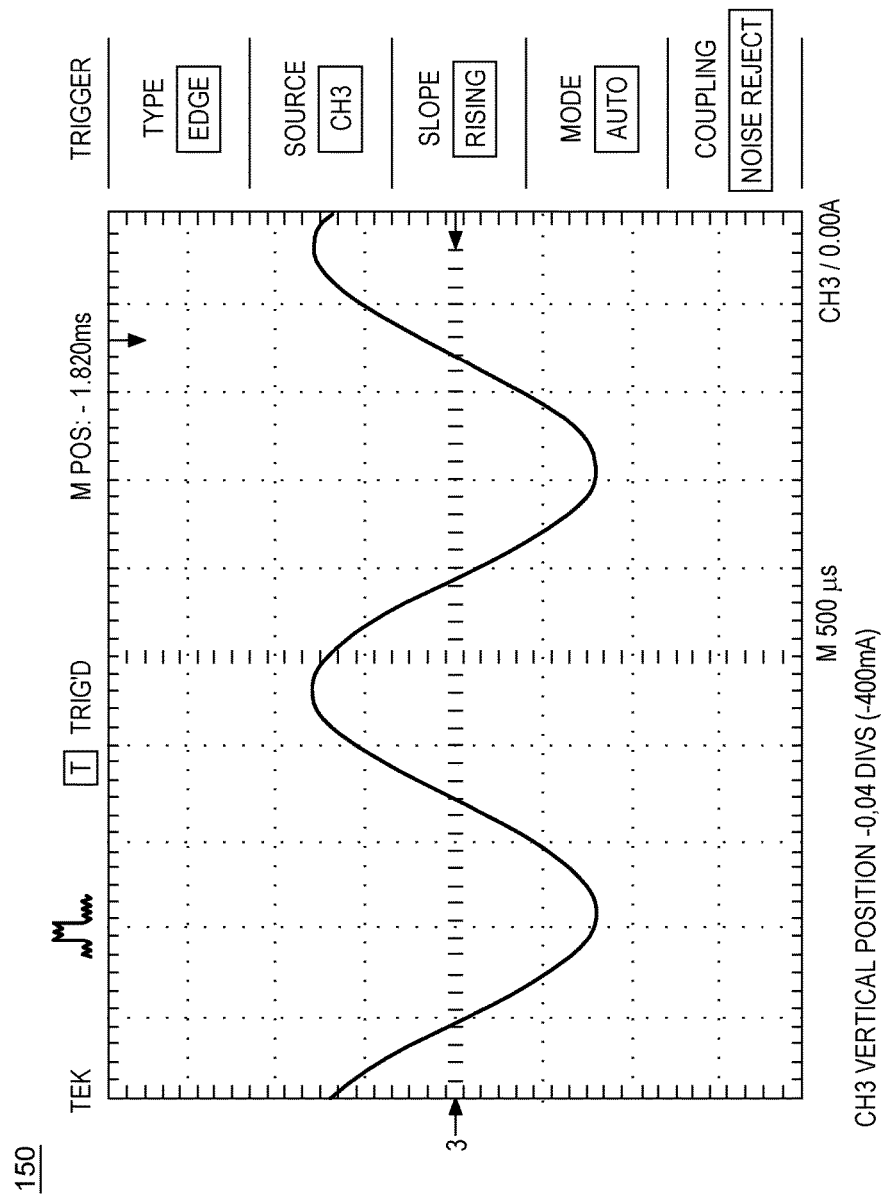
FIG. 4 illustrates an example plot depicting an input current waveform 150 at any phase of the three phase line drawn by the enhanced DC power supply 100 having the series nonlinear resonant LC circuit at the phase inputs to provide the corrected line current in accordance with one embodiment.

FIG. 4 shows a greatly improved generator line current, total harmonic distortion of less than 2% demonstrated at about 2.0 KWatt loads where LC resonates near the power line frequency.

In essence, this circuit exploits the variable impedance characteristics of the LC circuit apparatus. Design of L assures that less than 1% of the line range is sacrificed, to produce a power factor of 0.99 or better for normal line currents. The flux in L by design is determined by the line current, L can be designed to be reduced in value as the line current is increased beyond the corresponding full load supply current thus moving the circuit away from the resonant fundamental frequency with C. The increased impedance of this circuit will then limit the alternating current (AC) line current.

Thus, in one aspect, the present invention provides a circuit to the 12 step (or 24-step or greater) transformer power supply which:

1) Limits in-rush current during voltage turn on or transients;

2) Provides short circuit current protection for T1 should there be a shorted load or shorted secondary components;

3) Reduces EMI circuit current spectrum generation; and

4) Improves harmonic current to less than 2%, and achieves increased power factor as a result of the linear use of this LC circuit.

In view of FIG. 3, the present invention thus provides a simple, low cost circuitry for enhancing the power factor of such switching regulator or electronic voltage power supplies.

In one embodiment, a power factor improvement ranging from 1-2% has been achieved using the presently preferred embodiments described herein, which comprises a linear current transformer and a capacitor, at the front end input section of the power supply for direct connection to the AC power line. These improvements are achieved at least in part by the effect of this circuit 102 to enhance the input waveform to the power supply, reduce harmonics attributable to other circuitry within the power supply, and enhance the load demand.

Figure 2:
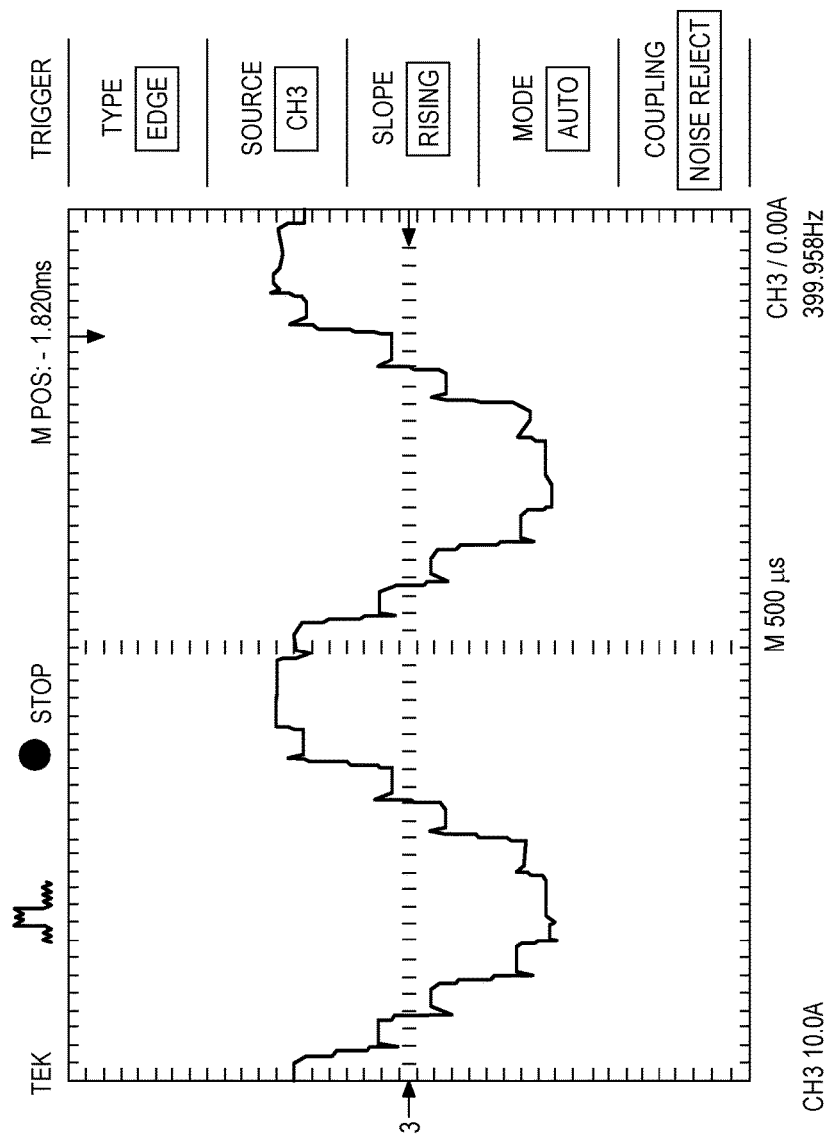
FIG. 2 illustrates an example plot depicting an input current waveform at any phase of the three phase line drawn by the conventional 12-step power supply 10 of FIG. 1.

Referring to FIG. 3, the preferred embodiment of the harmonic current reduction and power factor correction circuit 102 includes a linear inductor of inductance L and capacitor of capacitance C connected in a series fashion between each phase of the source voltage and each phase of the power supply input. Non-linear inductance L and capacitance C are designed and selected for values designed to attenuate the odd harmonics that otherwise distort the current IAC from the AC power line (the power line input being illustrated in FIG. 2 as a waveform). The harmonics are attributable principally to the step approximation of the transformer rectified Delta and Wye outputs. By proper selection of the value of inductance L the odd harmonic currents may be reduced to less than approximately 2% cent of their uncorrected value, at an AC power line frequency ranging from 47 Hz to 65 or 380 Hz-420 Hz.

The result is an input current to the power supply having a virtually distortion free sinusoidal characteristic as shown in the example waveform 150 of FIG. 4.

The capacitor C of the correction circuit is selected to have a value suitable to provide the reactive power (volt amperes) demanded by the load presented by power supply. The circuit voltage drop V1 which is proportional to its impedance at the power line frequency. (i.e., the demand current of the load represented by the power supply). Specifically, the voltage drop by the circuit is $I_{AC}*|Z|$ at the fundamental source frequency. With the inductive reactance=$X_l$ and the capacitance reactance=$X_c$, and with the quantity $X_l-X_c$ approaching zero, the voltage drop is $I_{AC}*R$ where R is essentially the loss in L.

Thus, an efficiency of 99.5% with a loss of less than 1% of the operating line range of the power supply is achieved for this circuit, while producing a power factor of greater than 0.98 for the power supply.

Further noteworthy results were achieved using the present invention with a Switching Power, Inc. Boeing model BX-2000 power supply. The supply tested was loaded to 2 KW at 60 HZ. Data was recorded with and without the present invention.

Figure 1:
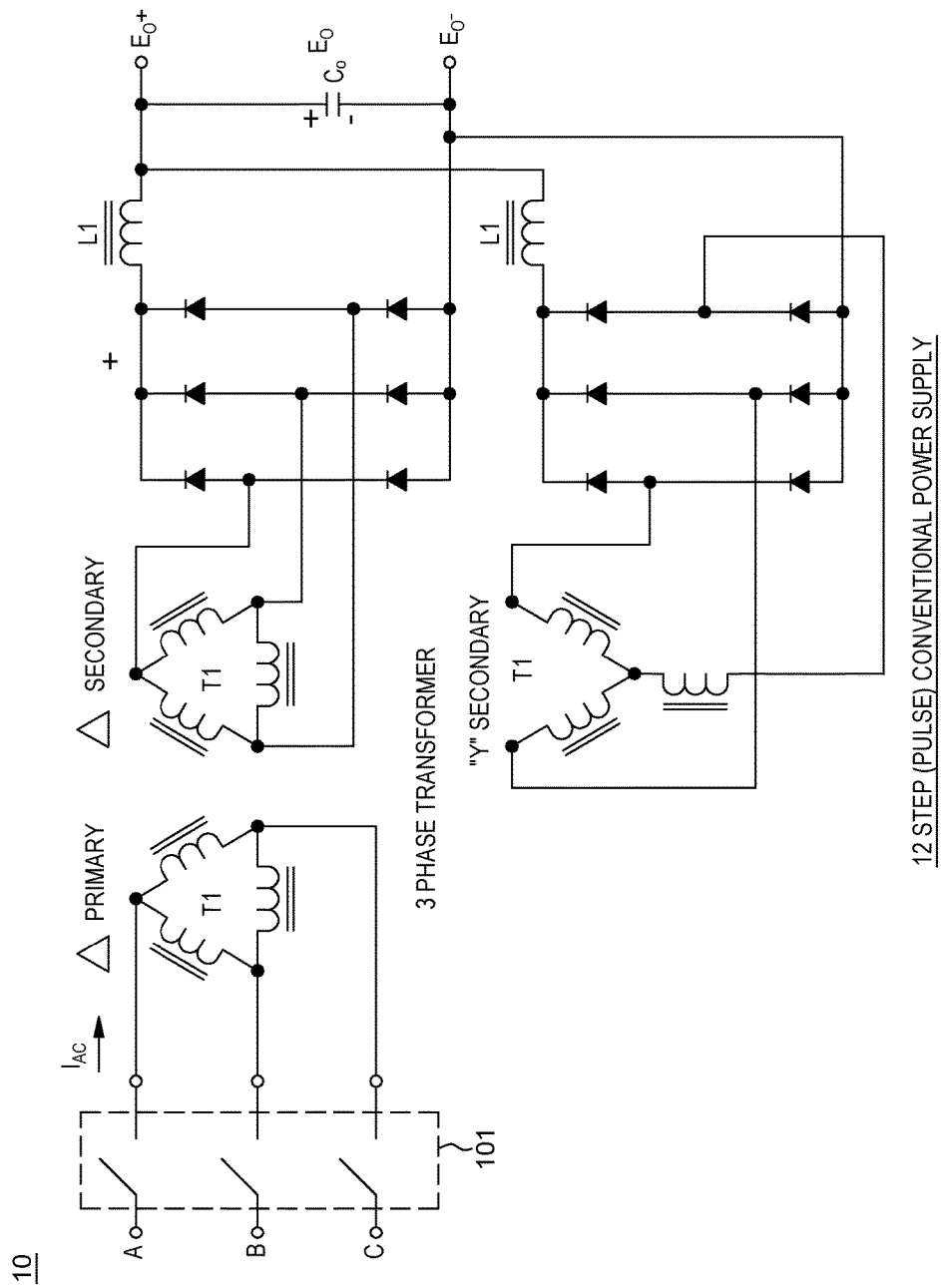
FIG. 1 illustrates a schematic diagram of a conventional uncorrected three-phase, 12 step (pulse) transformer rectifier power supply 10.

The uncorrected power supply 10 of FIG. 1 yielded greater than 10% input harmonic current.

Table 1 illustrates performance of an example operation of the BX-2000 Power Supply configured with the nonlinear resonant series LC circuit and connected with a 2 KW output load, and drawing AC line current input as shown in FIG. 4:

TABLE 1

| Freq (Hz) | Vin (Vrms) | Iin (Irms) | P.F. | ATHD (%) | Output Load (Vdc/A) |
|---|---|---|---|---|---|
| 58.2 | 115.66 | 11.1 | 0.999 | ~0.80 | 46.99 V/42.7 A |
| 60.0 | 115.63 | 11.1 | 0.999 | ~0.80 | 46.97 V/42.7 A |
| 61.8 | 115.63 | 11.1 | 1.00 | ~0.80 | 43.91 A/42.7 A |

| Single Harmonics | Ch1(%) | Ch2(%) | Ch3(%) |
|---|---|---|---|
| % AH03 | 0.50 | 0.51 | 0.20 |
| % AH05 | 0.47 | 0.54 | 0.35 |
| % AH07 | 0.16 | 0.28 | 0.17 |
| % AH09 | 0.07 | 0.25 | 0.10 |

TABLE 1-continued

| % AH11 | 1.24 | 1.10 | 1.00 |
|---|---|---|---|
| % AH13 | 0.70 | 0.90 | 0.90 |
| % AH15 | 0.04 | 0.06 | 0.06 |

In addition the introduction of the impedance |Z| in each phase results in a maximum input current, due to secondary transformer short circuit or rectifier failure of Vac/|Z|, thus providing by proper design of L and C the claimed overload protection.

According to an example test implementation, a current maximum of 50% above full load current was observed in short circuit of the output, simulating worst case failure of the transformer, rectifier or load short circuit.

In addition the introduction of the impedance |Z| of the harmonic current correction circuit limits the input inrush current during supply turn on. Data observed indicated a 100% reduction in in-rush currents on supply random AC input voltage application at peak of any phase voltage during power application. Currents as high as 100 A peak were mitigated to 50 A peak with the circuit described in reference to FIG. 3.

In addition, reducing the input current harmonic levels to less than 1% reduces the EMI spectrum, reducing the filter design requirements. The lack of 'step' high frequency input current edges implies reduced electromagnetic spectrum, that along with no high frequency carrier or modulator for reducing harmonic current through the use of an 'active current limit' circuit yields lower overall, low and high frequency conducted and radiated EMI spectrum.

Although an example of the present invention have been shown and described, it would be appreciated by those skilled in the art that changes might be made in these embodiments without departing from the principles and spirit of the invention, the scope of which is defined in the claims and their equivalents.

What is claimed is:

1. An AC to DC power supply comprising:
an n-step or pulsed power transformer rectifier configured to receive a 3-phase current from a connected 3-phase unregulated AC power source, said n-step or pulsed power transformer rectifier having respective inputs associated with a respective phase, and said power supply including at least a primary transformer winding, and a Delta connected secondary transformer winding and a Wye connected secondary transformer winding, each Delta and Wye connected secondary transformer windings operatively coupled to said n-step or pulsed power transformer rectifier having outputs in parallel to provide a DC voltage;
a passive circuit at each respective input of a respective phase, the passive circuit comprising a nonlinear resonant series connected LC circuit wherein L is an inductor having an inductance and C is a capacitor having a capacitance, said inductance in combination with said capacitance of values reducing odd harmonic frequency current components from the line current drawn by said power supply in response to a load being placed on said AC to DC power supply, said inductance in combination with said capacitance having values that set said LC circuit near resonance and below the fundamental frequency of said 3-phase current; and
wherein said power supply odd harmonic current components from the line current are reduced to less than approximately 2% of an uncorrected value to thereby reduce electromagnetic interference while achieving a power factor value of greater than about 0.98 at less than about 1% loss in line operating input voltage.

2. The AC to DC power supply of claim 1, configured to reduce an electromagnetic interference EMI radiation spectrum.

3. The AC to DC power supply of claim 1 operating at an AC power line frequency ranging from about 47 Hz to 65 Hz or about 380 Hz - 420 HZ.

4. The AC to DC power supply claim 1 wherein said nonlinear resonant series LC circuit limits a maximum input current responsive to a secondary transformer winding short circuit or power transformer rectifier failure.

5. The AC to DC power supply claim 1 configured with a turn-on switch to initiate power supply operation, wherein said nonlinear resonant series LC circuit provides an impedance configured to limit input inrush current during a turning on of said switch.

6. A method of operating an AC to DC power supply having an n-step or pulsed power transformer rectifier configured to receive a 3-phase current from a connected 3-phase unregulated AC power source, said n-step or pulsed power transformer rectifier having respective inputs associated with a respective phase, and said power supply including at least a primary transformer winding, and a Delta connected secondary transformer winding and a Wye connected secondary transformer winding, each Delta and Wye connected secondary transformer windings operatively coupled to said n-step or pulsed power transformer rectifier having outputs in parallel to provide a DC voltage output, said method comprising:
providing at each respective input of a respective phase a nonlinear resonant series LC circuit wherein L is an inductor having an inductance and C is a capacitor having a capacitance, said inductance value and capacitance value of said nonlinear resonant series LC circuit configured to achieve near resonance and below a fundamental frequency of said 3-phase current;
connecting a power supply load to an output of said AC to DC power supply; and
reducing, based on said configured nonlinear resonant series LC circuit, said AC to DC power supply odd harmonic frequency current components from the line current drawn by said power supply having said connected power supply load, wherein said odd harmonic frequency current components from the line current are reduced to less than approximately 2% of an uncorrected value to thereby reduce electromagnetic interference while achieving a power factor value of greater than about 0.98 at less than about 1% loss in line operating input voltage.

7. The method of claim 6, further comprising: reducing an electromagnetic interference EMI radiation spectrum using said nonlinear resonant series LC circuit.

8. The method of claim 6, further comprising: operating said AC to DC power supply line at input current frequencies ranging from about 47 Hz to 65 Hz or about 380 Hz - 420 Hz.

9. The method of claim 6, wherein said nonlinear resonant series LC circuit limits a maximum input current responsive to a secondary transformer winding short circuit or power transformer rectifier failure.

10. The method of claim 6, wherein said AC to DC power supply is configured with a turn-on switch to initiate power supply operation, wherein said nonlinear resonant series LC circuit provides an impedance configured to limit input in-rush current during a turning on of said switch.

* * * * *